UNITED STATES PATENT OFFICE.

EDUARD HEBERLEIN, OF WATTWIL, SWITZERLAND.

PROCESS FOR IMPARTING A TRANSPARENT APPEARANCE TO COTTON.

1,265,082.      Specification of Letters Patent.      Patented May 7, 1918.

No Drawing.      Application filed July 20, 1917. Serial No. 181,813.

*To all whom it may concern:*

Be it known that I, EDUARD HEBERLEIN, a citizen of the Swiss Republic, and resident of Wattwil, Canton of St. Gall, Switzerland, have invented a new and useful Process for Imparting a Transparent Appearance to Cotton, of which the following is a full, clear, and exact specification.

The chemical and physical changes wrought in cotton by action of concentrated caustic alkalis vary with the conditions under which the action occurs. The most important mode of operation is the treatment of the cotton under tension at the usual temperature with the caustic soda lye, commonly called mercerization and having for its object the production of a silky luster on the fiber.

The influence of the temperature on the mercerization process has frequently been investigated and it has been established, broadly, that the mercerization effect decreases as the temperature rises and increases as the temperature falls. Thus in Gardner's work "*die Mercerisation der Baumwolle*" published in 1912 there is given at p. 88 a table which shows the relative shrinkage of the cotton at various concentrations of the caustic soda lye for temperatures from $+2°$ C. to $+80°$ C. Quite generally, past investigations show that:

1. In the application of caustic soda lye of the concentration usual for mercerization, namely about 30° Baumé specific gravity, the temperature has no marked influence on the degree of mercerization, that is to say, the use of a cooled lye has no better effect than the use of lye at normal temperature.

2. When a diluted lye is used, which has no or insufficient mercerization effect at normal temperatures, the effect is improved by diminishing the temperature, becoming equal to that produced by lye of higher concentration at higher temperatures; that is to say, the same mercerization effect is obtained by mercerizing with lye of usual concentration at the usual temperature and by mercerizing with a more dilute lye and operating at a lower temperature.

Thus A. Kirchhacker has stated in Lehner's *Färber-Zeitung* 1911, page 71, that the mercerization effect is the better the lower the temperature, when a lye of under 30° Baumé specific gravity is used, while at higher concentrations the temperature has no longer any effect. Experiments in which the lye has been cooled below 0° C. have shown no better effect. In the same periodical (*loc. cit.*) Franz Erban states that cooling the mercerizing lye to 3°–10° C. saves lye.

Again, in O. Lindemann's dissertation "*Beiträge zur Kenntnis der Einwirkung von Natronlauge auf Baumwolle*", it is shown that no difference exists in the use of concentrated lye at temperatures between 0° and 25° C., while with a more dilute lye at 0°–10° C. a greater luster is produced than at higher temperatures, and at 0°–5° a lye containing 10.3 grams NaOH per 100 c. c. produces a luster approximately equal to that obtained with concentrated lye.

German Patent No. 112773 describes a process of mercerization in which the temperature of the lye is below 0° C. The process is strictly limited, however, to quite dilute lye of 10–12° Baumé specific gravity which at normal temperatures produces no shrinking but by very strong cooling does produce a mercerization luster.

German Patent No. 131134 and its patent of addition No. 131228 also treat of a mercerization by means of a lye at 0° C. The process is for mercerizing one side of a fabric; wherein the effect of the cooled lye resides is not apparent. It may be supposed that the cooling is for the purpose of mercerizing a half-wool fabric without attack of the wool fiber; there is no question of any particular action of the cooled lye on the cotton.

It will be seen that the various publications show that by cooling diluted caustic soda lye to about 0° C. nearly the same effect may be obtained as with concentrated lyes at ordinary temperature.

The present invention is based on the discovery that by treating cotton for a sufficient period with a caustic alkali lye cooled below 0° C. and of such concentration as would mercerize the cotton at the ordinary temperature, that is to say of at least 15° Baumé specific gravity, the cotton acquires a transparent appearance which is quite different from the mercerization effects hitherto known. For example, if a cotton fabric is impregnated for one minute with a caustic soda lye of 30° Baumé specific gravity and having a temperature of $-10°$ C., it acquires a transparent appearance, which is not lost even after washing and drying. The concentration of the lye, the temperature and the duration of the action can be varied according to the quality of the material and the desired degree of the effect. Variations in the effect may also be obtained by treating the material in tension or allowing more or less shrinkage during treatment. Pattern effects may be produced on the fabric by printing the cold caustic soda lye only on certain places, or by printing a reserve, for instance gum thickening, on the fabric and then subjecting the latter to the action of the cooled alkali lye.

Enhanced transparency is obtained by subjecting the fabric which has been treated at low temperature with the caustic soda lye, to the action concentrated sulfuric acid of over $50\frac{1}{2}°$ Bé.; hereby the sulfuric acid may also be applied at a low temperature, whereby the duration of the action may be lengthened; or the fabric is first treated with concentrated sulfuric acid and then with the cooled caustic soda lye. Furthermore, this combined process may be applied for producing on cotton fabrics pattern effects in the sense of my U. S. Letters Patents No. 1144655 and No. 1201961 that is to say by acting with one of the reagents only in places upon the fabrics. Finally the process of treatment with cooled lye may be conducted in the sense of my U. S. Letters Patent No. 1201961 and of my Letters Patent application Ser. No. 98295, filed May 18, 1916. Hereby transparent appearance is imparted to the material by acting upon the same alternately and repeatedly with alkali lye of about 15° Baumé at a temperature below 0° C. and with sulfuric acid of over $50\frac{1}{2}°$ Baumé in such a manner that a treatment with one of the said reagents takes place between two treatments with the other, the material being washed out after each of the said treatments and, if desired, stretched at least during one of the said treatments. When such repeated treaments with both the reagents are applied to cotton fabrics, a transparent appearance showing pattern effects can be obtained, when the reagent employed at least at one of the said treatments is caused to react only in places on the fabrics.

What I claim is:

1. The herein described process for imparting a transparent appearance to cotton consisting in treating the material with caustic alkali lye of at least 15° Baumé at a temperature below 0° C. until the transparent effect is produced.

2. The herein described process for producing transparent pattern effects on cotton fabrics, consisting in treating the goods in places with caustic alkali lye of at least 15° Baumé at a temperature below 0° C. until the transparent affect is produced.

3. The herein described process for imparting a transparent appearance to cotton, consisting in treating first the material with caustic alkali lye of at least 15° Baumé at a temperature below 0° C., washing the material after this treatment, subjecting the same subsequently for a few seconds to a treatment with sulfuric acid of over $50\frac{1}{2}°$ Baumé and finally washing the material.

4. The herein described process for imparting a transparent appearance to cotton, consisting in treating first the material with caustic alkali lye of at least 15° Baumé at a temperature below 0° C., washing the material after this treatment, subjecting the same subsequently to a treatment with sulfuric acid of over $50\frac{1}{2}°$ Baumé at a temperature below 0° C. and washing finally the material.

5. The herein described process for imparting a transparent appearance to cotton consisting in subjecting first the material for a few seconds to a treatment with sulfuric acid of over $50\frac{1}{2}°$ Baumé, then washing the material and treating it subsequently with caustic alkali lye of at least 15° Baumé at a temperature below 0° C.

6. The herein described process for imparting a transparent appearance to cotton, consisting in subjecting first the material to a treatment with sulfuric acid of over $50\frac{1}{2}°$ Baumé at a temperature below 0° C., then washing the material and treating it subsequently with caustic alkali lye of at least 15° Baumé at a temperature below 0° C.

7. The herein described process for producing transparent pattern effects on cotton fabrics, consisting in treating the goods in places with caustic alkali lye of at least 15° Baumé at a temperature below 0° C., washing the goods after this treatment and subjecting them subsequently for a few seconds to a treatment with sulfuric acid of over $50\frac{1}{2}°$ Baumé and washing finally the goods.

8. The herein described process for producing transparent pattern effects on cotton fabrics, consisting in treating the goods in places with caustic alkali lye of at least 15° Baumé at a temperature below 0° C., washing the goods after this treatment and subjecting them subsequently to a treatment with sulfuric acid of over $50\frac{1}{2}°$ Baumé and washing finally the goods.

9. The herein described process for producing transparent pattern effects on cotton fabrics, consisting in subjecting the goods in places for a few seconds to a treatment with sulfuric acid of over $50\frac{1}{2}°$ Bé., washing the goods after this treatment and treating them subsequently with caustic alkali lye of at least 15° Baumé at a temperature below 0° C.

10. The herein described process for imparting a transparent appearance to cotton, consisting in acting alternately and repeatedly on the material with alkali lye of at least 15° Baumé at a temperature below 0° C. and with sulfuric acid of over 50½° Baumé in such a manner that a treatment with one of the said reagents takes place between two treatments with the other, the material being washed out after each of the said treatments.

11. The herein described process for imparting a transparent appearance to cotton, consisting in acting alternately and repeatedly upon the material with alkali lye of at least 15° Baumé at a temperature below 0° C. and with sulfuric acid of over 50½° Baumé in such a manner that a treatment with one of the said reagents takes place between two treatments with the other, the material being stretched at least during one of the said treatments and washed out after each of the said treatments.

12. The herein described process for imparting to cotton fabrics a transparent appearance showing pattern effects, consisting in acting alternately and repeatedly upon the fabrics with alkali lye of at least 15° Baumé at a temperature below 0° C. and with sulfuric acid of over 50½° Baumé in such a manner that a treatment with one of the said reagents takes place between two treatments with the other, the reagent employed at least at one of the said treatments being caused to react in places on the fabrics and these latter being washed after each of the said treatments.

13. The herein described process for imparting to cotton fabrics a transparent appearance showing pattern effects, consisting in acting alternately and repeatedly upon the fabrics with alkali lye of at least 15° Baumé at a temperature below 0° C. and with sulfuric acid of over 50½° Baumé in such a manner that a treatment with one of the said reagents takes place between two treatments with the other, the reagent employed at least at one of the said treatments being caused to react only in places on the fabrics and the latter being stretched at least at one of the said treatments and washed after each treatment.

In witness whereof I have hereunto signed my name this 21st day of June 1917, in the presence of two subscribing witnesses.

Dr. EDUARD HEBERLEIN.

Witnesses:
 FRANK TIMMKE,
 EMIL MISLE.